United States Patent [19]

Christner et al.

[11] Patent Number: 4,495,154
[45] Date of Patent: Jan. 22, 1985

[54] FUEL REFORMER

[75] Inventors: Larry G. Christner, Sandy Hook; Jen-Jung Fan, Danbury, both of Conn.

[73] Assignee: Energy Research Corporation, Danbury, Conn.

[21] Appl. No.: 382,915

[22] Filed: May 28, 1982

[51] Int. Cl.³ .................... B01J 8/02; F28D 21/00
[52] U.S. Cl. .................... 422/203; 422/204; 422/211
[58] Field of Search ........... 422/202, 204, 206, 175, 422/211, 199, 220, 176, 203; 48/94, 196 A, 214 A

[56] References Cited

U.S. PATENT DOCUMENTS

| 1,826,548 | 10/1931 | Jaeger | 422/202 |
| 2,244,612 | 6/1941 | Crowley | 252/477 R |
| 2,562,993 | 8/1951 | Sensel et al. | 422/202 |
| 3,645,701 | 2/1972 | Banchik et al. | 422/220 |
| 4,088,450 | 5/1978 | Kosaka et al. | 422/211 |
| 4,285,910 | 8/1981 | Kennedy, Jr. | 422/220 |

Primary Examiner—S. Leon Bashore
Assistant Examiner—K. M. Hastings

[57] ABSTRACT

A fuel reformer wherein a catalyst is situated along the length of a chamber and wherein heat conductive means is also situated along such chamber length for promoting more uniform heating of the catalyst.

6 Claims, 2 Drawing Figures

FUEL REFORMER

BACKGROUND OF THE INVENTION

This invention pertains to reformers and, in particular, to reformers for reforming fuels by catalytic activity.

It is well known in the prior art to utilize an elongated chamber filled with a suitable catalyst to reform fuels such as methanol. It is also known that in order for the reforming reaction to take place, the catalyst must be heated. Usually, heating of the catalyst is accomplished by conveying a heated gas along the chamber outer wall. Heat from the heated gas then penetrates radially into the chamber to the catalyst.

With this mode of heating, non-uniformities are found to occur in the temperature of the catalyst along the chamber length. In particular, the catalyst first past by the heated gas is found to be at a higher temperature than the catalyst which is later past by such heated gas. This is due to the fact that the heated gas decreases in temperature as it proceeds along the chamber outer wall and is also due to the fact that the catalyst itself is a relatively poor heat conductor. The heat lost by the heated gas is thus not compensated for by heat conduction through the catalyst and the aforesaid non-uniformity in heating results.

The effect of such heating, in turn, is reduced efficiency in the reforming process. Furthermore, efforts to increase this efficiency by increasing the temperature of the heated gas are limited by the need to maintain the temperature at the forward end of the chamber below that which would be harmful to the catalyst.

It is therefore an object of the present invention to provide a fuel reformer having a greater uniformity in catalyst temperature.

It is also an object of the present invention to provide a fuel reformer whose average heating temperature is higher than that of prior art reformers.

SUMMARY OF THE INVENTION

In accordance with the principles of the present invention, the above and other objectives are realized in a reformer wherein a catalyst is disposed in and along the length of a reformer chamber and wherein heat conductive means is also disposed in and along the length of such chamber.

With the present reformer, heat conducted to the chamber by a heated gas passing adjacent the chamber outer wall is, in part, also conducted along the length of the chamber by the heat conductive means. As a result, heating of the catalyst at the forward end of the chamber is reduced, while heating of the catalyst at the rearward end is increased. An overall more uniform heating of the catalyst is thereby achieved.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
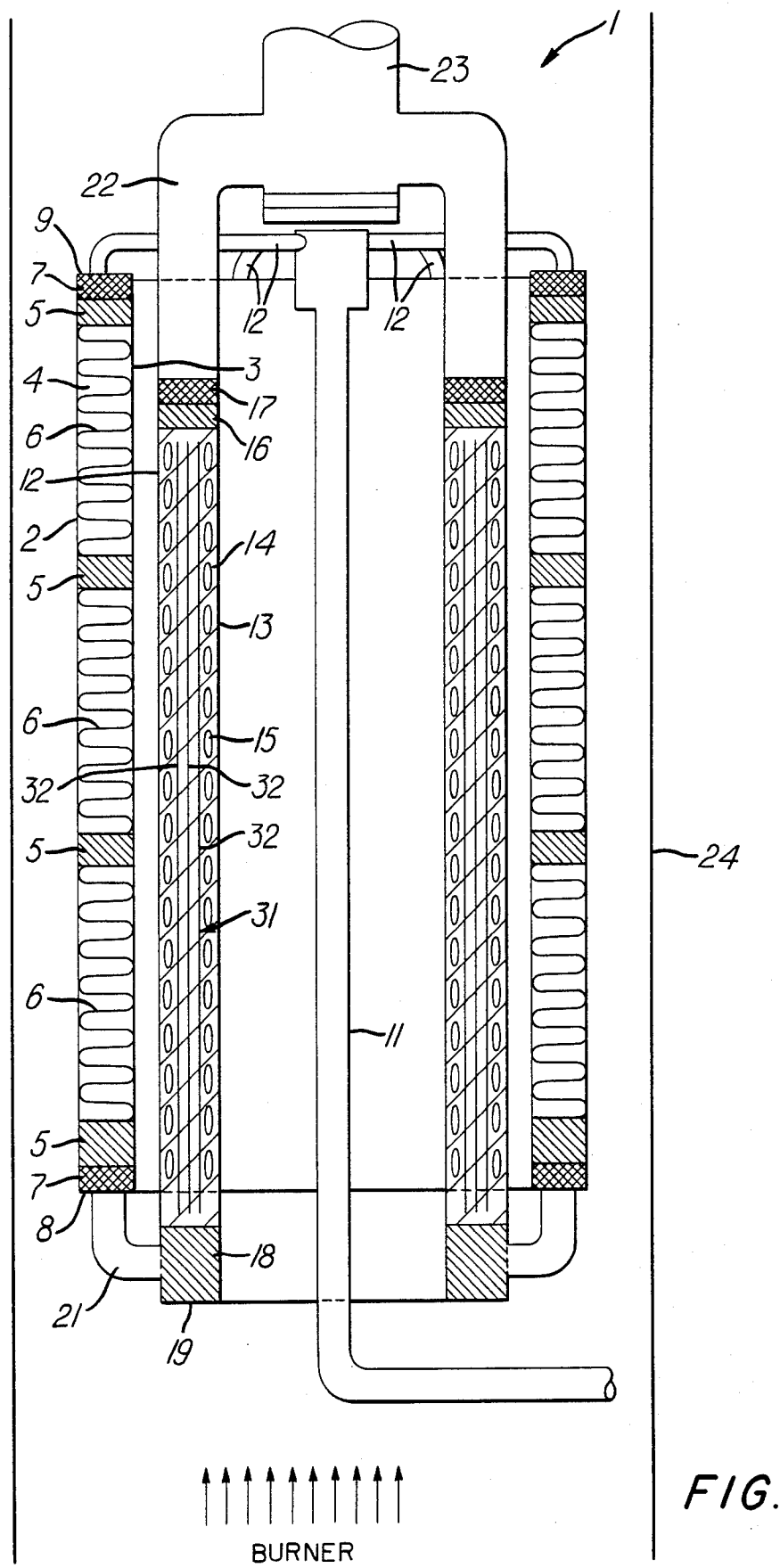
FIG. 1 shows a reformer in accordance with the principles of the present invention.

In FIG. 1, a fuel reformer 1 in accordance with the principles of the present invention is shown. The reformer 1 is illustrated as a methanol steam reformer but the principles of the invention are applicable to other types of reformers such as, for example, autothermal reformers and methane reformers.

A first set of inner and outer tubular members 2 and 3 define a vaporizing chamber 4. Distributed along the length of the chamber 4 are foametal rings 5 of a suitable material. Annular scouring pads 6 are disposed between successive rings 5 and the ends of the chamber 4 are capped by further annular scouring pads 7 and by end plates 8 and 9.

A mixture of methanol fuel and water is fed into an input conduit 11 which extends centrally relative to the tubular members 2 and 3. Arms 12 branch radially from the conduit 11 and feed circumferential inlet ports in the plate 9 at the top of the chamber 4.

A further set of inner and outer tubular members 12 and 13 are disposed interiorly of the members 2 and 3 and together define a reforming chamber 14. Disposed in and along the length of chamber 14 is a catalyst 15. An annular foametal ring 16 and an annular scouring pad 17 close the top end of chamber 14 and an annular foametal ring 18 is disposed at the bottom end of the chamber. The latter end is closed by a plate 19 and is fed vaporized fuel and water from the chamber 4 via an annular conduit 21. A further annular conduit 22 is situated at the top of chamber 14 and includes an outlet tube 23 for carrying reformed fuel from the processor.

An outer vessel 24 encloses the tubular members 2, 3, 12 and 13 and carries heated gas developed by a burner along the outer and inner walls of the tubular members and, therefore, along the chambers 4 and 14 defined thereby. As the heated gas proceeds along these chambers, it causes vaporization of the fuel mixture in chamber 4 and reformation of the vaporized mixture in chamber 14.

Figure 2:
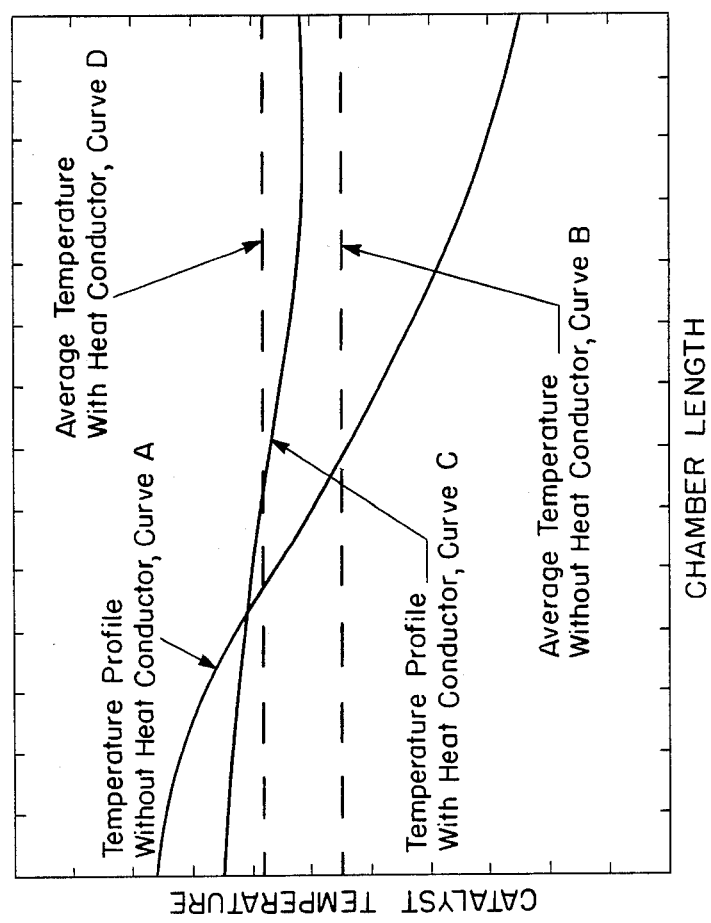
FIG. 2 shows a representative graph illustrating the temperature of the catalyst bed of the reformer of FIG. 1 relative to a standard reformer.

More particularly as the heated gas proceeds along the length of the chamber 14, a portion of the heat energy of the gas is transferred radially into the chamber to heat the catalyst 15, thereby resulting in the aforementioned reformation. Due to this radial heat transfer, the heated gas when it arrives at points further along its path and, therefore, further from the forward end of chamber, is of decreased temperature. The energy transmitted radially to the catalyst at these points is thus also decreased, resulting in a decreased heating of the catalyst. Since the catalyst is a relatively poor heat conductor, the decreased heating from the heated gas is not compensated for by the axial transfer of heat along the catalyst. The result is that the catalyst is non-uniformly heated, with the lower catalyst temperatures being further along the path travelled by the heated gas (i.e., at the rearward end of the chamber 14). This non-uniform heating is depicted by a representative curve A in FIG. 2 and results in an average temperature depicted by curve B and in less than maximum reforming efficiency.

In accordance with the present invention, more uniform catalyst heating is realized by further including in the chamber 14 along the chamber length a heat conductor 31 which in the present illustrative case takes the form of elongated metallic wires 32 situated in the catalyst. These wires cause axial transfer of some of the radially transferred heat of the heated gas. Catalyst heating at initial points along the heated gas path (i.e., at the forward end of chamber 14) is thus reduced, while catalyst heating at points further along such path (i.e., at the rearward end of chamber 14) is increased. The overall effect is, therefore, a more uniform catalyst heating along the chamber length as depicted by representative curve C in FIG. 2, and a higher average temperature as illustrated by curve D.

The type of material used for the conductive wires 32 will depend upon the temperature to which the catalyst must be raised to obtain the necessary fuel reforming. In the present case of methanol steam reforming, which is at relatively low temperatures, copper material has been found to be usable. In the case of higher temperature reformers such as, for example, methane and autothermal reformers stainless steel or Inconel would be required.

The improved efficiency resulting from the use of conductive means 31 in the reformer chamber 14 of the present invention allows that the reformer can be significantly decreased in size relative to a conventional reformer while still realizing substantially equivalent reforming. This is illustrated by the following table which compares the physical and operating characteristics of two equal capacity reformers, one made in accordance with the invention and the other in accordance with conventional practice.

It should be noted that the fuel burned in the burner to obtain the heated gas for the reformer 1 can be any type of conventional fuel. Propane or methanol are two examples of suitable burner fuels.

TABLE
COMPARISON OF THE METHANOL REFORMER

|  | NEW REFORMER | STANDARD REFORMER |
|---|---|---|
| Capacity (75% Utilization) | 2 KW | 2 KW |
| Total Weight (Reformer + Vaporizer) | 3 kg | 7 kg |
| Amount of Catalyst | 350 g | 2300 g |
| Catalyst Volume | 400 cc | 1800 cc |
| Type of Catalyst | Crushed (16–20 mesh) | Pelleted ($\frac{1}{4}'' \times \frac{1}{4}''$) |
| Overall S.V., $hr^{-1}$ | 7200 | 1600 |
| Overall Size | 4.5" (OD) × 15" (L) | 14" (OD) × 22" (L) |
| $CH_3OH$ Conversion | 99+% | 99+% |
| CO Concentration | 0.6% | 0.6% |
| Operating Temperature | 550–450° F. | 475° F. |
| Burner Fuel | Propane | Methanol |

In all cases, it is understood that the above-described arrangements are merely illustrative of the many possible specific embodiments which represent applications of the present invention. Numerous and varied other arrangements can readily be devised without departing from the spirit and scope of the invention.

What we claim is:

1. A reformer for reforming a fuel comprising:
   a member having an elongated chamber;
   a catalyst disposed within said chamber along the length of said chamber;
   a heat conductive means disposed within said chamber along the length of said chamber, said heat conductive means comprising one or more elongated, thin, continuous pieces of metallic wire, each piece of metallic wire being in said catalyst and extending continuously over the length of said chamber over which said catalyst extends, whereby heat transferred to said catalyst in a direction transverse to the length of said chamber is transferred by said metallic wire through said catalyst along the length of said chamber.

2. A reformer in accordance within claim 1 further comprising:
   a vessel enclosing said member for carrying heated gas along the wall of said member defining said chamber.

3. A reformer in accordance with claim 1 or 2 wherein:
   said chamber is annular.

4. A reformer in accordance with claim 3 wherein:
   said chamber member comprises concentric tubes,
   said chamber being defined by the annular space between said tubes.

5. A reformer in accordance with claim 1 wherein:
   said wire is one of copper, stainless steel and Inconel.

6. A reformer in accordance with claim 1 further comprising:
   foametal means positioned so that said fuel passes through said foametal means prior to entering said chamber.

* * * * *